Dec. 13, 1966  L. B. BORST  3,291,694
NEUTRON AMPLIFIER
Filed April 24, 1957  4 Sheets-Sheet 1

INVENTOR.
LYLE B. BORST
BY
Davis, Hoxie & Faithfull
ATTORNEYS.

Dec. 13, 1966  L. B. BORST  3,291,694
NEUTRON AMPLIFIER
Filed April 24, 1957  4 Sheets-Sheet 2

INVENTOR.
LYLE B. BORST
BY
Davis, Hoxie & Faithfull
ATTORNEYS.

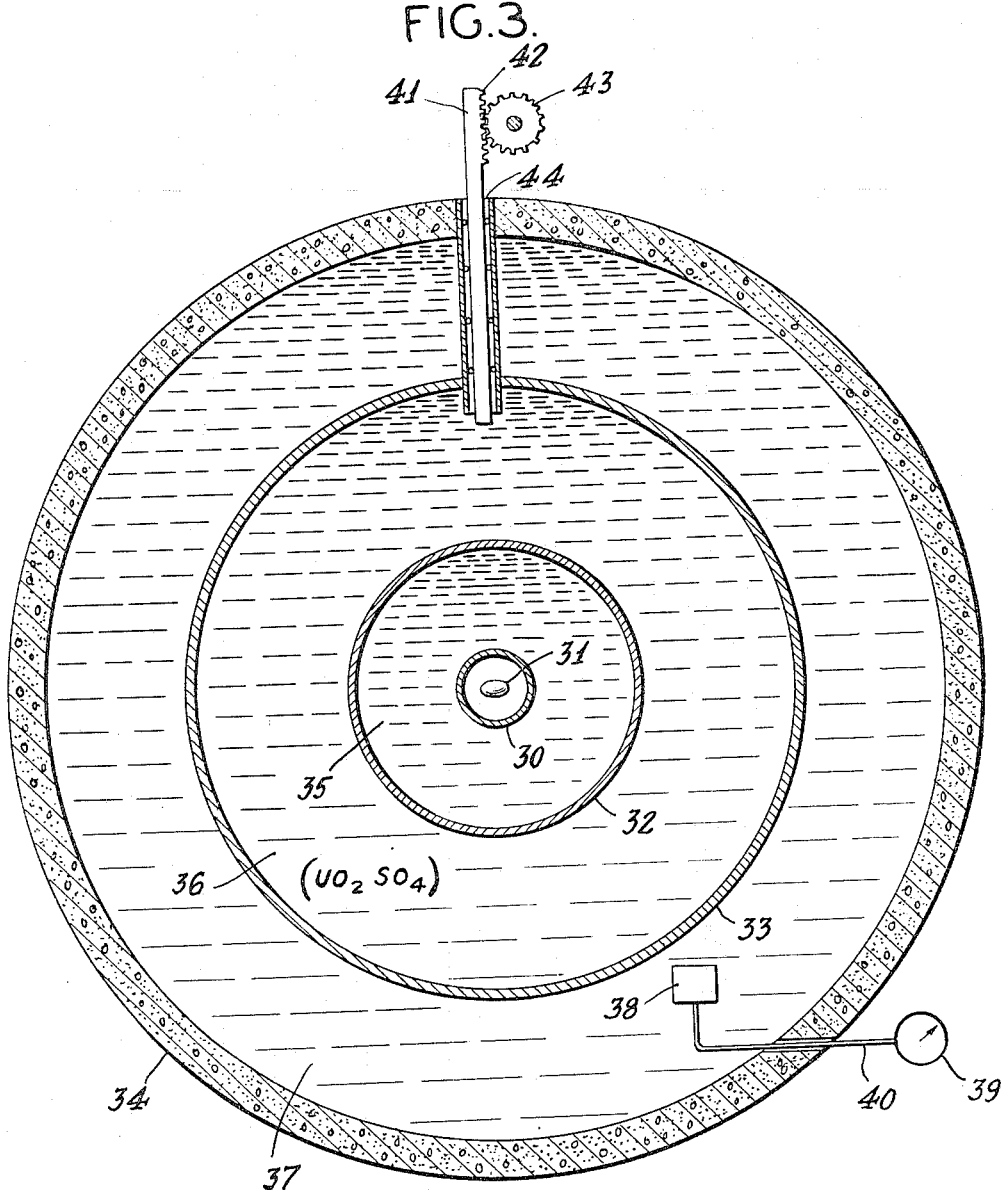

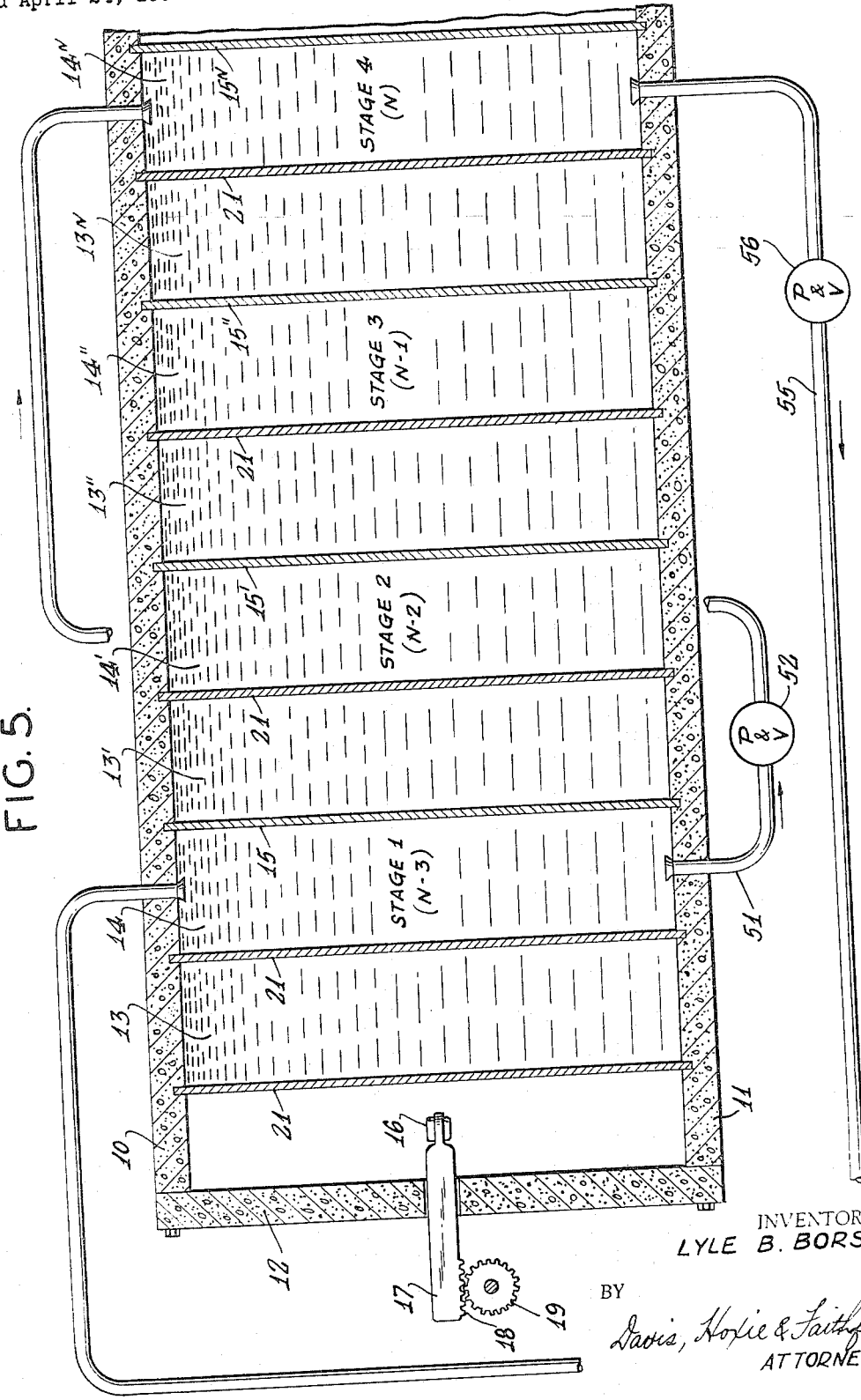

3,291,694
Patented Dec. 13, 1966

3,291,694
NEUTRON AMPLIFIER
Lyle B. Borst, Ossining, N.Y., assignor to The Dow Chemical Company, Midland, Mich., a corporation of Delaware
Filed Apr. 24, 1957, Ser. No. 654,837
7 Claims. (Cl. 176—11)

This invention relates to neutronic reactors for industrial and scientific uses having a controllable neutron output.

In neutronic reactors a neutron fissionable isotope such as $U^{233}$, $U^{235}$, $Pu^{239}$, is subjected to fission by absorption of neutrons and a self-sustaining or divergent chain reaction is established if the reactor is made sufficiently large and of the proper materials. However by the proper selection of fissionable material concentration and the geometric configuration thereof, either in or surrounded by a moderator material such as graphite or water, a convergent, i.e., non-self-sustaining or sub-critical chain reaction may be developed, with a neutron output which is a function of its neutron exciting input. My invention provides such a subcritical reactor having capabilities and advantages hereinafter specifically described.

Its nature and substance or principle is the use of a neutron producing isotope in an environment which establishes a chain reaction below criticality and which would, therefore, without additional stimulation, decay to a quiescent or non-reactive non-neutron producing state in a period of time depending on the concentration of the isotope and the environment thereof, in combination with stimulating means capable of preventing and reversing the tendency toward convergence so that a steady-state condition (still below criticality) may be maintained either by exciting the isotope with a controllable neutron-exciter or by regenerating the isotope with spontaneous or delayed neutrons produced by the chain reaction, so that the stimulating neutron exciter need be used only as a starter for the reaction. Variants in the application of this principle provide variable control of the re-excitation, temperature coefficient adjustment of the reactor system, and spontaneous or delayed feedback, producing a neutron generator having a polarized (unidirectional) amplified neutron flux which may be a linear or non-linear (saturated) function of the stimulating neutron source.

More specifically, the invention may be embodied in a neutron amplifier stage by the provision of a neutron producing isotope material, adjacent one face of which is a layer or slab of neutron moderator material and adjacent the other face of which is a layer or slab of thermal energy level neutron barrier material. The input portion of this three layer array is the moderator layer into which neutrons of epithermal energy levels are projected. The moderator material because of its diffusion effect on such fast neutrons will slow them down to thermal energy levels. These converted, i.e., slow or thermal neutrons, will project themselves into the adjacent neutron producing isotope material layer and be absorbed or captured by the isotope material, effecting fission and producing the by-products, alpha and beta particles, gamma rays and neutrons. Since neutrons are of interest for the present purposes, the fission reaction is designed to maximize the neutron by-products, the other by-products being of secondary importance by minimizing parasitic capture in the fuel by choice of fuel and choice of enrichment and neutron energy (fast vs. slow). Precautions for shielding and absorbing these unwanted by-product radiations will be necessary to minimize their effects. For example, the Brookhaven Shield described in U.S. Patent 2,726,339 granted December 6, 1955 to Lyle B. Borst, entitled "Concrete Shielding Composition," appropriately designed, may be used for this shielding and absorbing requirement.

By the proper selection and concentration of the fissionable material and of the geometric configuration of the reactor it becomes responsive to thermal neutrons in a non-self-sustaining or convergent chain reaction. The neutrons evolved from the fission are predominantly fast neutrons which will be projected in spherical patterns. Only those neutrons which are projected or diffused toward the "output" face of the neutron producing intermediate fuel layer are transmitted to the next stage of the amplifier. Those projected or diffused backward toward the input moderator layer are either converted to slow neutrons which are eventually absorbed by the moderator material or by the thermal neutron barrier, or reenter the fuel region to effect additional fission as slow neutrons. Those which are projected in other directions are absorbed or shielded harmlessly by appropriate absorbing and shielding material such as concrete, graphite, cadmium, etc. Adjacent the fuel region is placed a thermal neutron barrier layer made for example of very thin cadmium. The barrier functions to absorb substantially all neutrons of thermal energy levels. This barrier region I shall also term the output region of the amplifier. The epithermal neutrons escaping through this region are thus the output neutrons of the stage.

The outer face of the barrier or output region will have projected therefrom fast neutrons greater in number than those applied to the input region by the neutron source. The enhanced neutron flux may then be considered the neutron source for a second stage, similar in principle to the first stage. Accordingly, a number of such stages may be cascaded to give any degree of amplification. Each amplifier stage is appropriately shielded so that there is no interaction other than the desired output of one applied to the input of a selected other.

As stated above, one of the essential criteria of the system is that the amplification or generation of neutrons must be subcritical as assembled in this system. In order to satisfy this requirement the neutron production rate (I) will be related to the source intensity (S) by the following relation $$I = \frac{S}{1 - K_{eff}} \quad (1)$$

where S is the source intensity in neutrons per second I is the neutron generation rate in neutrons per second, and $K_{eff}$ is the effective multiplication factor for the system, i.e., the ratio of fast neutrons produced in one generation by the fissions to the original number of fast neutrons in an actual system of finite size.

The above referred to continuing effect of the stimulation from the neutron source S to produce a steady state condition despite the subcriticality of the chain reaction (ante p. 1) may be explained as follows: Assume $K_{eff}$ is 0.9 and that S is 1,000, then the first generation increment of fission will be $SK_{eff}$, i.e., $1,000 \times 0.9$ or 900, and the sum or aggregate of S and this first increment will be 1,900; the second generation S increment will be $SK_{eff}^2$, i.e., $1,000 \times 0.9^2$ or 810, and the aggregate 2,710; the third generation S increment will be $SK_{eff}^3$, i.e., $1,000 \times 0.9^3$ or 729, and the aggregate will be 3,439. etc. If $K_{eff}$ is less than unity ($K_{eff} < 1$) this series has a finite sum $$S \sum_{i=0}^{\infty} K_{eff}^i = \frac{S}{1 - K_{eff}} = \frac{1,000}{0.1} = 10,000$$

Thus the summation of all the fissions results in a greater number of neutrons than were applied. This may be called the intrinsic magnification of the amplifier stage which I will term M.

Thus $$M = \frac{I}{S} = \frac{1}{1 - K_{eff}} \quad (2)$$

where I and S are the parameters of Equation 1 above.

The actual gain of neutrons per stage is somewhat less than M and is related thereto by the relation $$G = \alpha M \quad (3)$$

where G is the actual gain (i.e. output/input) of neutrons per stage, $\alpha$ is the efficiency factor and M is the intrinsic multiplication per stage.

If, referring to Equation 1, the factor $K_{eff}$ is greater than unity a divergent chain reaction occurs. If the K is effectively less than unity the chain reaction is convergent, non-self-sustaining or subcritical. Various dimension factors in the construction of the reactor may be adopted within the restriction that the $K_{eff}$ is less than unity and a method of determining the effective K of a system experimentally will be described infra.

So long as $K_{eff}$ is less than unity the neutron generation rate (I) will be proportional to the source intensity (S). When $K_{eff}$ approaches unity the denominator of the above relation becomes small and the quotient or ratio becomes large without bounds. If $K_{eff}$ is equal to unity then the ratio of I/S becomes infinite and a self-sustaining chain reaction exists. In this case the source intensity S has no influence upon the neutron generation rate (I) which may be arbitrarily large, if not explosive.

The temperature coefficient characteristic of the system may be utilized to give, at choice, neutron amplification as either a linear or a non-linear function of a variable neutron input. The temperature coefficient affects the neutron reproduction factor or multiplication factor of each stage. This multiplication factor $K_{eff}$ discussed above defines the average number of fast neutrons which are generated for all fissions occurring in the fuel region. If $K_{eff}$ is a constant the system will be linear, that is, the output neutrons will be proportional to the input neutrons. If $K_{eff}$ is a variable, the system will be non-linear. If the temperature coefficient is negative, increasing neutron inputs will raise the temperautre of the system and thereby reduce the $K_{eff}$, causing a saturated neutron response characteristic as a function of a variable neutron input. If the temperautre coefficient is positive, increased temperature will increase the multiplication factor $K_{eff}$ thereby increasing the neutron density (I) in the stage, which in turn will increase the heat produced in the fuel, further increasing the temperature, the multiplication factor $K_{eff}$, the intrinsic multiplication per stage (M) and gain (G). This is an autocatalytic effect and must be restrained for a stable system, i.e. $K_{eff} < 1$. Under the conditions whereby $K_{eff}$ is kept below unity, a non-saturated response characteristic may be achieved. Control of the temperature rise of the system within the designed values may be implemented by heat transfer means built into the stage.

A neutron amplifier of the invention may be provided with a regeneration or "feedback" feature by constructing the thermal barrier layer so that it is partially transparent to thermal neutrons. This may be done by dimensioning the thickness of the barrier layer to pass neutrons of a desired thermal energy level, so that, for example, 1% of incident output thermal neutrons of a given stage will be passed from the moderator region of the subsequent stage back through the barrier region and into the fuel region of the given stage. The same effect may be achieved by providing shutter windows in the barrier layer which may be externally manipulated to control a desired prescribed opening so proportioned as to pass a desired percentage of the output thermal neutron flux impinging on the barrier layer.

A third way of effecting feedback is by constructing the moderator region of a given stage so that a desired percentage of fast neutrons generated in the fuel region of the stage will be diffused backward through the moderator region thence through the thermal barrier of the preceding stage and into the fuel region of the preceding stage to produce additional fission therein. These neutrons for this variant will be above thermal energies, and because the thermal barrier is effectively transparent to them, they are freely passed backward to the preceding stage.

A fourth way of effecting feedback depends on the following principles: In addition to the neutrons produced spontaneously by fission, neutrons continue for a time to be produced by the neutron irradiated material, after the initial fission. Accordingly, by providing means for transferring the fuel material of one stage back into the fuel region of a preceding stage (not less than three) the time of transferring the material being synchronized with the delay of the fuel in producing the delayed neutrons, additional fission neutrons may be utilized to effect enhanced amplification of the so regenerated stage and thereby raise the gain of the system.

By appropriate design, any one or more of the four regeneration or feedback features outlined above may be advantageously applied to the neutron amplifier of the invention so that once the system has reached a desired neutron generation level, the neutron exciter (the neutron source) may be extinguished or withdrawn and the system thereafter will be maintained in a self-sustaining but convergent operation.

Further flexibility in the use of the invention is achieved by the addition of control rods either in the moderator or fuel region. The rods may be positive acting, i.e., contain fuel of prescribed concentration to enhance the neutron fission reaction, or, they may be negative acting, i.e., contain neutron absorber material to enhance the neutron absorbing function, thereby providing a means for assured safe operation of the amplifier in addition to controlling or varying the output level.

Briefly, the neutron amplifier of the invention is capable of generating a neutron flux which is a function of a smaller controllable neutron flux input, the output being maintainable to a constant value or being variable by (1) varying the intensity of the neutron source, (2) varying the moderator or fuel regions with addition and removal of control rods during operation, (3) varying the effective backward transmission of epithermal or thermal neutrons through the barrier thereby in effect having feedback, (4) transferring delayed neutron fissionable material from the fuel region of one stage to a preceding stage, and (5) providing the system with a negative temperature coefficient whereby the neutron output is a non-linear function of the neutron input.

The neutron amplifier of my invention in addition to having the known utility of neutron generators has the unique advantage that a high power level can be attained without a divergent chain reaction. It is therefore an intrinsically stable system which will respond to the control of the source excitation. It is not, therefore, subject to excursions or excess power operation and can appropriately be installed in cities and in situations where safety is of paramount importance.

Other objects and advantages of my invention will be apparent from the following description.

The attached drawings illustrate and the following text describes several specific embodiments of the invention, and may be taken as setting forth, in accordance with the statutory requirement, the best modes now contemplated of carrying out the invention.

In the drawings:

FIG. 3 is a sectional view of an embodiment of the invention in a plurality of concentric spheres;

FIG. 5 is a section of a modification of FIG. 1 constituting a regenerative amplifier.

The simplest form of the invention may be constructed in the form of a slab reactor in which the various regions of the reactor are contained within the walls of a generally rectangular parallelepiped concrete enclosure.

Figure 1:
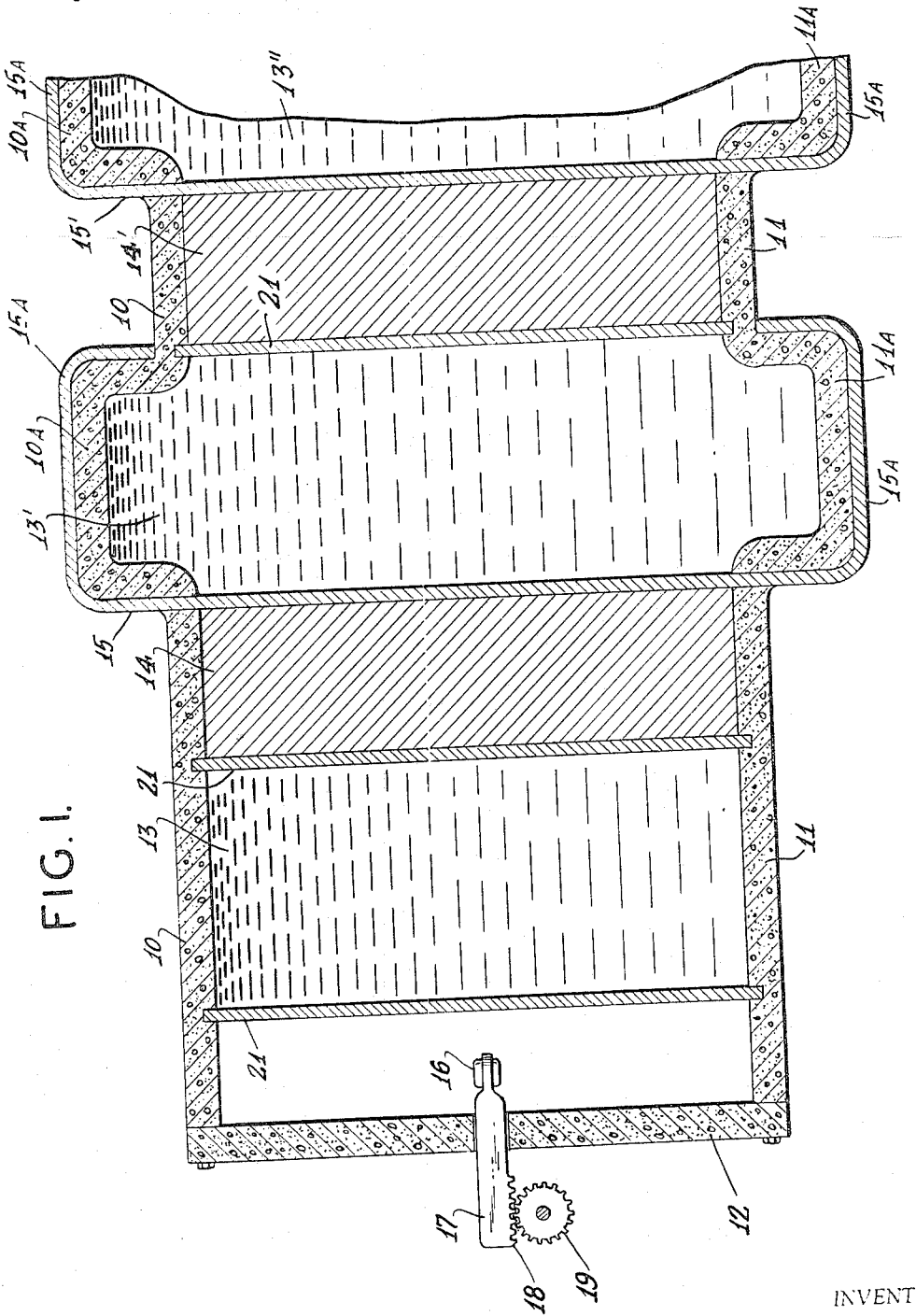
FIG. 1 is a sectional view of the neutron amplifier.

FIG. 1 is a sectional view of the first two stages of such a neutron amplifier. The walls 10, 11 and 12 are made of shielding and absorber material such as concrete containing hydrogen or water or, the shield material described in my U.S. Patent 2,726,339 previously mentioned. The thickness of the shielding walls will depend upon the total neutron output expected of the system. The three main regions of the amplifier are represented generally by the moderator region 13, the fuel region 14 and the thermal neutron barrier region 15. Corresponding regions of subsequent amplifier stages are represented by 13', 14' and 15' respectively. Additional stages of similar design are added to the two stages shown commensurate with the desired degree of neutron amplification.

In the design of the neutron amplifier it is essential that undesired leakage of neutrons be prevented between stages. The form selected (e.g. rectangular, spherical or cylindrical) will determine what expedient will be necessary. For the rectangular form being described, transverse extension of the moderator region 13' as shown at 10A and 11A (and of all subsequent moderator regions) will satisfy this criterion. It will be understood that the side walls of the moderator regions, not shown in the sectional view FIG. 1, will be similarly extended. Although not necessary, it may be advantageous to extend also the thermal neutron barriers 15 adjacent the extended walls of the moderator regions shown as 15A.

A neutron source 16 carried by a rod 17 is mounted in the wall 12 and is adjustable by the rack 18 and pinion 19. The neutron source may consist of a natural source such as radium-beryllium material or it may be an artificial source such as a Van de Graaf or a Cockcroft-Walton accelerator. These artificial accelerator neutron sources may be modulated to follow a sinusoidal variation in the order of $10^3$ to $10^4$ cycles per second and the neutron amplifier of the invention will follow such variations, since the average transit time of the neutrons from stage to stage is in the order of $10^{-5}$ seconds (i.e. not greater than $10^{-4}$ seconds).

The moderator region 13 may be constructed in accordance with presently known reactor design considerations qualified only to the extent of the geometric limitations to be discussed. The moderators for example may consist of water, heavy or light, beryllium (Be) or beryllium oxide (BeO) and graphite. Light water ($H_2O$) has the advantage of having the shortest slowing down distance, that is, the shortest distance necessary to convert fast or epithermal neutrons to thermal or low energy levels, and accordingly makes the dimensional scale of such a system the least of all the types available. Practical thicknesses of the moderator region 13 using light water would be about 3–15 cm. Light water however has a significant absorption for slow or thermal neutrons so that the diffusion of slow neutrons is limited. Since the slowing down length in water is greater than the thermal diffusion length (see Table I below), thermal neutrons can never be obtained without contamination of epithermal or fast neutrons. The use of light water ($H_2O$) will therefore necessarily result in some epithermal or fast neutron leakage which may be deleterious if not considered. Heavy water ($D_2O$) however has excellent diffusion characteristics but in less efficient in the moderation of fast to slow neutrons. If heavy water were used for the moderator region 13 it would have a thickness in the order of 10 to 50 cm. Of the many types of moderator available graphite may be used as the moderator and as such would have a thickness for the moderator region 13 of 15–50 cm. and if beryllium were used, for example, thickness would be 10–25 cm.

Important constants for these various moderator materials are (1) the slowing down length, (2) the diffusion length, and (3) the scattering mean free path. These constants are summarized in Table I.

TABLE I.—MODERATOR CHARACTERISTICS

| Moderator | Slowing Down Length, cm. | Diffusion Length, cm. | Transport Scattering Mean Free Path, cm. |
|---|---|---|---|
| $H_2O$ | 5.7 | 2.88 | .426 |
| $D_2O$ | 11.0 | 100 | 2.4 |
| Graphite | 18.7 | 50 | 2.71 |
| Be | 9.9 | 23.6 | 2.1 |
| BeO | 12.0 | 30 | 1.65 |

The moderator must be a compromise between good thermalization and good leakage. For the case of water in particular the fast neutron intensity will diminish according to an exponential law $$I = I_o e^{x/\tau} \qquad (4)$$

where $I_o$ is the neutron flux entering the moderator. I is the flux at position X. $\tau$ is the slowing down length. The moderator must diminish the fast neutron flux going backward from stage $n$ to stage $n-1$ by a factor greater than the gain per stage. Since a gain of ten is considered reasonable, a factor of 20 or $e^{-3}$ would be desirable which is equivalent to $3\tau$.

In water however, because the thermal diffusion length is less than the slowing down length, thermal neutrons can never be segregated from fast neutrons. The thermal neutron intensity in the forward direction from stage $n-1$ to stage $n$ will therefore likewise be attenuated by a factor of twenty, so that a very high intrinsic magnification will be required.

In heavy water ($D_2O$) the diffusion length is large compared to the slowing down length. Therefore slow neutrons will diffuse into regions virtually free of fast neutrons. A good moderator thickness would therefore be three slowing down lengths which is one-third of a diffusion length. Fast neutrons would be virtually eliminated so that reverse flow from stage $n$ to stage $n-1$ would be blocked by the thermal neutron barrier region (to be discussed infra). Thermal neutrons would diffuse well into the stage $n$ without serious attenuation by moderator absorption.

The transport scattering mean free path is useful in determining the variation of neutron flux at or near the boundaries of the system.

In order to prevent a liquid moderator from mixing with other materials of the amplifier, walls 21 are disposed on the boundary of region 13 as shown. Walls 21 may be made of sheets of stainless steel or thin aluminum or other materials which are transparent to neutron flow. Stainless steel has the additional advantage of being an inhibitor of corrosion, and accordingly may be used intermediate all stages to prevent corrosion due to water or water solutions reacting with metals such as cadmium.

The cross-sectional (transverse) area of the amplifier of FIG. 1 (looking into the paper) is not critical. For practical purposes of construction the height and width should be nearly equal to each other. An appropriate value is about five times the thickness of region 13. Thus, if heavy water were selected as the material for moderator region 13, and the thickness finally determined was 20 cm., the length and width would be 100 cm. x 100 cm. If the cross-section of region 13 were circular, i.e. the form of FIG. 1 were cylindrical rather than a rectangular parallelepiped, the radius for the cross section of region 13 would be 55 cm. For moderator regions 13' and all subsequent moderator regions, the cross-section will be slightly larger. For example, using the instant dimensions, 13' would have a cross-section of 125 cm. x 125 cm. if rectangular and a radius of 75 cm. if circular.

The fuel region 14 may include only fuel material, i.e. thermal neutron fissionable isotope material, or it may consist of fuel and moderator material mixed either as an intimate mixture such as a chemical solution or thin plates, wires (rods) or spheres of fuel interspersed with moderator. Any of three fissionable species of $U^{235}$, $Pu^{239}$ or $U^{233}$ may be used. Various degrees of isotopic enrichment of these fissionable materials may be used but the use of highly enriched fuels is preferred. However under special circumstances, more particularly circumstances which limit the size of the amplifier, natural or unenriched uranium (0.71% $U^{235}$, 99.29% $U^{238}$) or slightly enriched uranium (0.8–2.0% $U^{235}$, 98.0–99.2% $U^{238}$) in combination (as a solution) with heavy water ($D_2O$) may be used.

The important fissionable characteristics for the fuel material are (1) neutrons produced per thermal neutron absorbed ($\eta$), (2) neutrons per fission ($\nu$), (3) fission cross-section for thermal or slow neutrons ($\sigma_s$), (4) fission cross-section for epithermal or fast neutrons ($\sigma_f$) and (5) total cross-section for fast neutrons ($\sigma_t$). These constants as published are given below in Table II.

TABLE II.—FUEL CHARACTERISTICS

| Fuel | (1)$\eta$ (Ratio) | (2)$\nu$ (Ratio) | (3)$\sigma_s$ (Barns) | (4)$\sigma_f$ (Barns) | (5)$\sigma_t$ (Barns) |
|---|---|---|---|---|---|
| $U^{235}$ | 2.08 | 2.46 | 580 | 1.3 | 6.4 |
| $Pu^{239}$ | 2.03 | 2.88 | 750 | 2 | 7.00 |
| $U^{233}$ | 2.31 | 2.54 | 533 | 2 | 5 |

The value $\eta$ determines the number of neutrons produced per thermal neutron absorbed. This corrects for the absorption of neutrons in the fuel which do not produce fission. The constant therefore determines the number of neutrons produced for each thermal neutron entering from the moderator zone. The fission event produces neutrons of high energy (up to 15 million electron volts but with an average value of 1 mv.). Some of these neutrons will cause fission before they are moderated. In these cases the number of neutrons per fission $\nu$ is more significant than $\eta$. If the fuel consists of a pure fissionable isotope ($U^{233}$, $U^{235}$, $Pu^{239}$), most of the fissions will occur as fast fission. If, however, the fuel is mixed with moderator, most of the fissions will be produced by slow neutrons.

This distance X a neutron must travel in the fuel zone without moderator before producing fission will be determined by its fission cross section. For fast neutrons in $U^{235}$ it may be determined from the relation $$I = I_o e^{-\frac{\rho A_o \delta_f X}{A}} \quad (5)$$

where:

$\rho$ = density
$A$ = atomic weight
$A_o$ = Avogadro's number
$X$ = distance of penetration For fast neutrons the means distance is 15 cm.; for thermal neutrons it may be similarly shown that the means distance is 0.03 cm. Thermal neutrons diffusing into the fuel zone will therefore travel less than a millimeter whereas fast neutrons will travel a considerable distance before fission.

The fast neutron leakage from the fuel slab will be controlled by the total cross-section for fast neutrons. Since the amplifier depends upon leakage to feed the next state, this leakage affects the efficiency of the stage. The mean distance between collisions will be 3 cm. A balance must be achieved between the requirement of approaching criticality and achieving a satisfactory leakage. The thickness cannot therefore be large compared to 3 cm. because of inadequate neutron leakage; on the other hand it cannot be small as compared to 15 cm. in order to insure neutron interaction.

The fuel regions 14, 14', etc., as stated above, may be unmoderated and accordingly consist only of fissionable fuel. Although the neutrons from source 16 or the output of a preceding stage will produce thermal neutrons and thereby thermal fission, significant contributions to the desired neutron generation will be produced by fast neutron fission occurring in the fuel region. Also, a significant proportion of fast neutrons produced by the fission in region 14 would escape from the region 14 into the moderator region 13 and be moderated therein to thermal neutrons and would return into the region 14 to produce slow neutron fission. Similar effects will occur in all subsequent stages.

The thickness of the fuel region 14 must be less than that required to produce a critical chain reaction as considered in the unusual geometry of the slab reactor of the invention, that is, the fuel region 14 having a moderating reflector 13 on its left side as shown in the drawing and the thermal neutron barrier 15 on the right side which effectively is a virtually total neutron absorber of thermal energy levels. In other words, in the calculations for the thickness of the fuel region 14 allowance must be made for the fast neutrons penetrating through the thermal barrier 15 which will for the most part be moderated by the moderator region 13' and will therefore be unable to return through the thermal barrier 15 back into the fuel region 14. Some of the fast fission neutrons however will be scattered back into the fuel region 14 and from the barrier region 15 or even from the moderator region 13' before being moderated to thermal energy levels. These scattered fission neutrons will augment the fast fission and thermal fission occurring in region 14.

The thickness of the fuel region 14 must be small enough to permit a reasonable fraction of fast neutrons to escape into the next stage moderator region 13'. The mean free path for scattering of fast neutrons in $U^{235}$ is about 3 cm. The fuel region 14 may therefore have a thickness of 5–10 cm. It can be shown that a simple one group (i.e. assuming all fast neutrons) critical calculation using an unmoderated bare slab of $U^{235}$ results in a critical thickness dimension of 10 cm. The moderator regions 13 and 13' will certainly reduce this calculated value so that the fuel slab will safely and certainly be less than 10 cm. thick.

As stated above, the fuel region 14 may be moderated, i.e. it will not be isotopically pure fissionable fuel. Such a moderated fuel region may be constructed using a homogeneous mixture of fissionable fuel and a moderator material, for example, a heavy or light water solution of a uranium compound such as uranyl sulphate $UO_2SO_4$. Other forms of a moderated fuel region useful as the region 14 may be a series of uranium wires or rods or thin slabs of fuel interspersed in a moderator or it might be in the form of a lattice in which the fuel is in the form of clustered particles, rods or spherical lumps. This latticed configuration is most advantageously used for natural or slightly enriched uranium in a heavy water moderator. The thickness of such a region 14 using light water may be in the order of 6–20 cm., depending upon the fuel concentration.

Depending on the operating temperature of each stage, heat transfer means will be included in the fuel regions 14, 14', etc. to extract excessive heat from the reaction. The details for such means are considered well within the skill of the present state of the neutron reactor art generally and accordingly are not shown in the drawings or discussed herein. For example, see such devices as disclosed in Fermi U.S. Patent 2,708,656.

The thermal neutron barrier 15 may be constructed of any well known strongly thermal neutron absorbing material. It is preferable that the material be quite transparent to neutrons appreciably above thermal energy. Cadmium is an excellent material for such a barrier since it strongly absorbs neutrons of energy of less than ½ electron volt but has only limited absorbing power for neutrons of high energy. Boron or lithium may also be used although their absorption characteristics for epithermal energy neutrons is appreciable and as such would tend to reduce the transparency of the barrier for epithermal neutrons. The thickness of cadmium being used as a thermal barrier 15 in which but 1% of the thermal neutrons would be transmitted therethrough is in the order of 0.05 cm. thick. In order to inhibit corrosion of the thermal barrier material stainless steel may be used to separate water solutions in regions 14 and 13′ from the barrier. The steel may be in a separate sheet intermediate the thermal barrier and the liquid regions or it may be applied as a protective layer. Other corrosion inhibiting materials which may be used are aluminum, zirconium and titanium.

The practical cross-sectional areas within the walls 10 and 11 and the side walls (not shown) of the fuel regions 14, 14′, etc. and barrier regions 15, 15′, etc. are controlled by the cross-section of the moderator regions. Otherwise the design of these cross-sections is not critical.

Additional stages of the neutron amplifier of the invention represented generally by regions 13, 14 and 15 may be arranged in a cascaded series of stages, the output region represented by the thermal neutron barrier 15 being adjacent to the input region of the next subsequent stage represented by the moderator region 13′. Each stage, depending on the input neutron flux to its moderator region 13, 13′, etc., will be similar in design with the following qualification. Assuming a distributed neutron source 16 having a flux of $10^5$ n/sec.-cm.$^2$, distributed over the whole region 13, the first four stages may be identical in design. And assuming further a gain of 10 per stage the neutron density output of stage 4 would be $10^9$ n/sec.-cm.$^2$. At this level the heat of a reactor stage would be sufficient to require heat exchangers or coolants to maintain constant temperature. Accordingly, subsequent stages would be modified with heat exchangers. Assuming a requirement for a reactor having an input of $10^{12}$ n/sec., a $10^6$ kw. power output in the form of heat which is equivalent to $8 \times 10^{19}$ n/sec., seven stages of amplification would be sufficient.

More specifically, the first several stages for a slab-geometry neutron amplifier using heavy water for moderator region 13 of three different thicknesses, cadmium for the thermal barrier region 15 and isotopically pure $U^{235}$ for the fuel region 14 may be as follows:

Cross section area within concrete walls—200 cm. x 200 cm. (40,000 cm.$^2$)
Cd (bound in stainless steel 1 mm. thick)—0.5 mm.

| Gain per stage (neutrons out/ neutrons in) | Percent of Critical Thickness of Unmoderated Fuel Region 14 | | |
|---|---|---|---|
| | For 50 cm. D$_2$O Moderator 13 | For 25 cm. D$_2$O Moderator 13 | For 12.5 cm. D$_2$O Moderator 13 |
| 1 | 98.2 | 95.0 | 88.0 |
| 2 | 99.1 | 97.5 | 93.5 |
| 5 | 99.6 | 99.0 | 97.6 |
| 10 | 99.8 | 99.5 | 98.8 |
| ∞ | 100.0 | 100.0 | 100.0 |
| | (1) | (2) | (3) |

[1] 5.5 cm. critical thickness for Fuel 14.
[2] 5.75 cm. critical thickness for Fuel 14.
[3] 5.95 cm. critical thickness for Fuel 14.

As another example of a stage of amplification which may be constructed in accordance with the principles outlined above, region 13 may consist of a hydrogenous moderator 7–20 cm. thick, fuel region 14 may consist of $U^{235}$ 3–10 cm. thick and the thermal barrier region 15 may consist of a cadmium sheet 0.05 to 0.1 cm. thick. The second stage 13′, 14′ and 15′ may be of similar dimensions. After sufficient stages of amplification, viz., 6, a heat removal system not shown or described will be required and provisions may be made for the removal and replacement of spent fuel and also the removal of water which has been decomposed by radiation.

Another example of a neutron amplifying stage may consist of a beryllium moderator 15 cm. thick for region 13, a 35 to 50 gm./liter light water solution of uranyl nitrate ($UO_2(NO_3)_2$) 15 cm. thick for fuel regions 14, and a sheet of cadmium 0.5 mm. thick protected by 1 mm. sheet of stainless steel for the barrier regions 15. The cross-sectional area again may be 200 cm. x 200 cm.

In operation the neutron source 16 is inserted within the reactor by the means shown. The fast neutrons from the source 16 enter into the moderator region 13. Generally, although not necessarily, these neutrons will be above thermal energy levels. These neutrons will be moderated or slowed down by the moderator material in region 13 until they are at thermal energy levels. They will diffuse. Those which diffuse in the forward direction, that is, to the right in FIG. 1, into the fuel region 14 will be absorbed by the fuel material. Fast neutrons will be generated by fission. Some of these fast neutrons will cause fast fission within the fuel region 14 and others will be moderated by elastic collision with the moderator in region 13 until they are at thermal energies. These moderated or slow neutrons will again diffuse and then be captured by the fuel in region 14 producing yet more fast neutrons.

Fast neutrons produced by fission in the fuel region 14 will be projected in all directions. Those moving forward, that is, to the right of FIG. 1, will penetrate through the thermal neutron barrier 15 and will then be moderated to thermal energy level neutrons by the moderator material in region 13′. These neutrons so thermalized cannot migrate backwards, that is, to the left of drawing FIG. 1 because they will be absorbed by the thermal neutron barrier 15. By this means there is established a neutron reactor stage which is effectively decoupled from the previous stages wherein nuclear fission is occurring. Since most epithermal or fast neutrons which may migrate into region 13′ will be moderated into thermal neutrons the barrier region 15 is an effective shield or filter between stages of neutron fission reactors.

The thermal neutrons diffusing or migrating into the fuel region 14′ will produce fission therein and fast fission neutrons produced therefrom may move back into the moderator region 13′. These fast fission neutrons will be moderated by elastic collision so that there is little chance of a fast neutron from fuel region 14′ penetrating the thermal neutron barrier region 15 to activate the fuel in region 14. Any fast or thermal neutrons which may escape through the walls 10 and 11 of region 14′ will be prevented from reaching previous fuel region 14 or the subsequent fuel region (to the right of FIG. 1 and 14′) will be blocked or absorbed by the extended wall regions 10A and 11A or the moderator region 13′ included therein.

Neutrons which are thermal therefore are prevented from moving to the left of the drawing, that is, to the input side of the system by the thermal neutron barriers 15 and 15′, etc. Fast neutrons are prevented from moving to the left by the moderator regions 13 and 13′ which in nearly all cases reduce their energy to thermal energy levels so that the barrier regions 15 and 15′ are effective. The amplifier system is therefore polarized so that the system is asymmetric. Neutron flow to the left is prevented and neutron flow to the right is encouraged.

The fuel system must be so designed that the moderator regions 13 and 13′ will hold the epithermal or fast neutron leakage from succeeding stages back to the preceding stages appreciably less than the forward flow of epithermal neutrons from preceding stages to the succeeding stages. The fuel regions 14 must be so designed as to give a large reproduction of neutrons and further that a large fraction of these penetrates the thermal neutron barrier 15, 15', etc., so as to be received by the next amplifier stage.

In accordance with design considerations outlined above each stage may have a gain (G) of 10. With such a gain and assuming a neutron source 16 having a source intensity S of 1,000,000 neutrons per second, the moderator region would diffuse the neutrons from the source into the fuel region 14 where there would be produced by fission a convergent chain reaction resulting in 50,000,000 neutrons per second. Of these as many as one-fifth or more would penetrate the cadmium wall 15 (so that the input to the next stage would be 10,000,000 neutrons, i.e., a stage gain (G) of 10, be moderated in the moderator section 13' and be diffused into the fuel region 14' where they would generate in the order of 500,000,000 neutrons per second. The next stage would have applied to it through the barrier region 15', 100,000,000 neutrons per second which in turn would result in a gain per stage of 10.

As indicated above, the neutron amplifier of the invention is not limited to its dependency on the intensity of the source of neutrons. If, for example, neutrons are allowed to migrate into the fuel region 14 from a subsequent stage or, in other words, from the output of a given amplification stage, enhanced fission results. Accordingly, the thermal barrier region 15 may be designed to allow a selected percentage of thermal neutrons to migrate back from moderator region 13' into the fuel region 14. This may be done in several ways. The first method would be to design the thickness of the cadmium material so that a controlled or selected fraction of the neutrons thermalized in moderator region 13' will be allowed to return through the cadmium material 15 to the fuel region 14 to produce fission and thereby additional neutrons. The advantage to be gained is increased amplification per stage with a given increment of $K_{eff}$ from criticality. Feedback should not be excessive or there will be loss of control of the source resulting in a divergent chain reaction in a particular stage.

Since this reverse leakage will be proportional to the neutron flux or density, it will respond to neutron source modulation. In other words, if the neutron source 16 were selected as an alternating source up to a frequency of 10,000 cycles per second (the presently viewed response time of the system) the feedback flux density would be proportional and faithfully responsive to such an alternating source.

As a second method of controlling the feedback neutrons the transparency of the cadmium barrier 15 may be varied as a function of time and as such may be considered analogous to a control grid in a vacuum tube.

Figure 2:
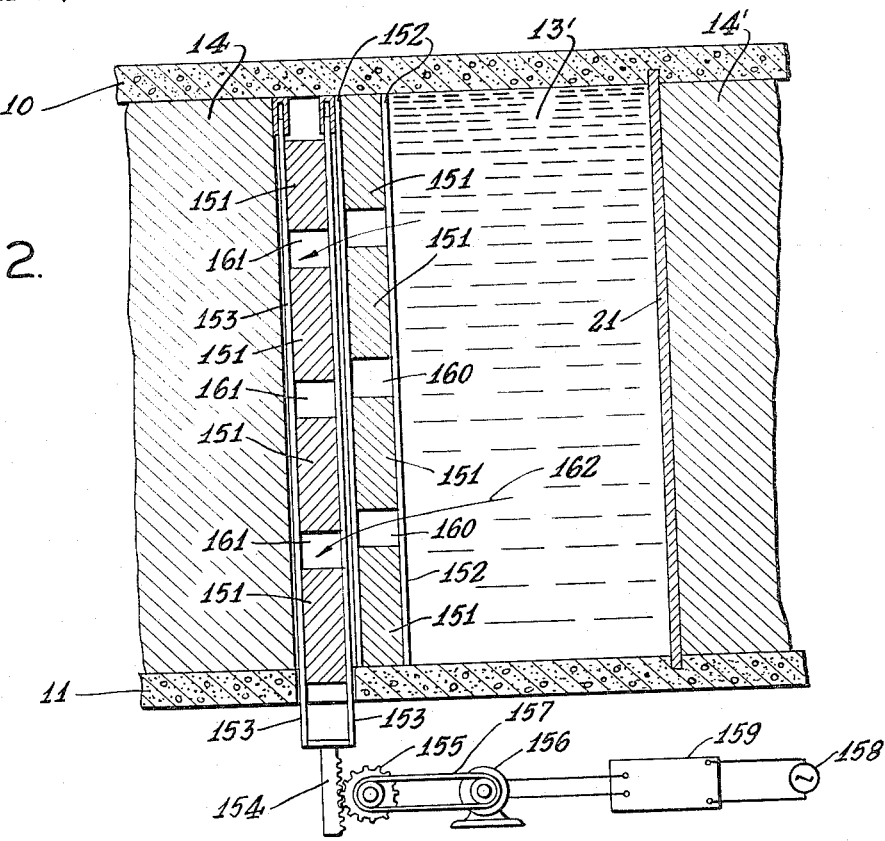
FIG. 2 is a fragmentary sectional view of a modification of FIG. 1.

The means for performing such a function is illustrated in FIG. 2 and is shown as a fragmentary portion of FIG. 1, the corresponding elements being identical for reference purposes in such a modified system. In place of a solid cadmium barrier 15 there is shown a shutterlike arrangement comprising a plurality of cadmium strips 151 supported by rods 152 in a plane transverse the prevailing flow of neutrons in the reactor disposed similarly as the cadmium plate 15 of FIG. 1. Each of the cadmium strips 151 is spaced with respect to the other into adjacent strips so as to provide an aperture through which neutrons of any energy level may pass therethrough when the structure is in a desired position. A second array of cadmium strips 151 are supported by a movable pair of rods 153. Rods 153 are movably projected through an aperture in the lower shield wall 11 and are connected to a rod 154, a portion of which is provided with gear teeth. The rod 154 is movably engaged by gear wheel 155 which is in turn rotated by servo motor 156 by means of a belt 157. The servo motor 156 is powered by an alternating voltage source 158 whose voltage is amplified by an amplifier 159.

In operation the oscillating movement of rod 154 in response to the variations of alternating current signal from source 158 causes the lefthand cadmium slab array to move in a vertical motion to open and close the apertures 160 and 161 relative to each other at a rate proportional to the signal source 158. A percentage of the thermal neutrons migrating from moderator region 13', which would otherwise be absorbed by a cadmium material such as 15 in FIG. 1, will be allowed to pass through the apertures along paths indicated generally by arrow 162 to be absorbed by the fissionable material in region 14 producing additional fission.

Although the structure for effecting such a variation of aperture openings has been described in terms of a vertical oscillating shutter it is to be appreciated that many shutter mechanisms are possible such as a rotating disc.

A still further variation of the invention in which the broad principle of feedback is utilized is shown in drawing FIG. 5. The structure as shown is similar to the structure of FIG. 1 and those components which are identical to those of FIG. 1 are similarly identified. In order to simplify the drawing, the extended moderator region 10A and 11A of FIG. 1 is not shown in FIG. 5, but is understood to be incorporated therein. Two additional stages (third and fourth) are added and are represented by regions 13", 14" and 15", and $13^N$, $14^N$ and $15^N$ corresponding to regions 13, 14 and 15, respectively. The present form of the invention utilizes a fluid fuel in regions 14, 14', 14" and $14^N$. For example, a water solution of uranyl sulphate. The several fluid fuel regions are interconnected with piping and valve and pump means for transferring the liquid fuel from one stage to a selected preceding stage as desired. There is shown a pipe 51 connecting the lower portion of region 14 and the upper portion of region $14^N$ and a pump and valve means 52 for effectively pumping and valving the fluid from fuel region 14 to region $14^N$ as indicated by the arrow showing the fluid flow direction. There is also provided another pipe means 55 and pump and valve 56 for pumping the fluid fuel from region $14^N$ to region 14. By such a pumping arrangement there is provided the means for circulating and thus feeding back the fissionable fuel from any of the subsequent stages to any of the preceding stages.

The principle of the feedback operation depends on the characteristics of certain types of fissionable materials which have the feature of delayed neutron emitting fission product precursors included in the liquid fuel. Typical radioactive reactions which manifest such delayed neutron fission products are represented by the following two relationships:

$$Br^{87} \rightarrow Kr^{87} \rightarrow Kr^{86} + n$$
$$I^{137} \rightarrow Xe^{137} \rightarrow Ke^{136} + n$$

A tabulation of a typical delayed neutron data for $U^{235}$ is shown below:

| Half life, sec.: | Yield, percent of total fission neutrons |
|---|---|
| 55.6 | .025 |
| 22.0 | .166 |
| 4.51 | .213 |
| 1.52 | .241 |
| 0.43 | .085 |
| .05 | .025 |

Additional long-lived delayed neutron groups of low intensity have been observed as disclosed by L. B. Borst et al., Physical Rev. 91, 594 (1953), which may play a significant part in shutdown and startup of the neutron amplifier. Neutrons from the gamma ray bombardment of beryllium, deuterium, etc. will contribute such delayed neutron reactions as well.

In operation, fuel containing the delayed neutron emitters is circulated from a later stage of the amplifier back to a selected preceding stage. The delayed neutrons emitted while the fuel is in the early stage will augment the neutrons supplied by the external source 16. If each stage has, for example, a gain of 10, transfer of fuel from stage N(4) as labelled in FIG. 5 to stage N–3 reduced in neutron density by a factor of 1,000 ($10^3$), will provide a neutron source of the same order as the input neutron flux to the stage. If the number of emitted delayed neutrons/second does not exceed the number of n/sec. from the previous stage, the delayed feedback contribution will not be the controlling factor. That is, the contribution of delayed neutrons will not assume control of the reaction as compared to the source. If, however, the delayed neutron source is carried farther back in the amplifier stages it can be large compared to the external source so that the external source 16 may be removed as a continuous excitation. In this event full control of the neutron amplifier resides in the control of the feedback effected by the transfer of the delayed neutron fuel from a subsequent to a selected preceding stage.

Such a control is effected by the operation of the various pump and valve means 52 and 56.

Since decay of the delayed neutron emitters or precursors is exponential, the delayed neutron source will reflect (a) the neutron flux at the source 16 and (b) the transit time of the fluid being pumped between the stages. Control of the feedback can therefore be achieved by controlling the transit time of the fuel by manual or automatic timing means controlling the various pumps and valves intermediate the several stages shown. Closing of the valves will stop the replenishment of the neutron source and the decaying neutron emitters will eventually decay to the point where the amplifier power will die away. By such an arrangement it is appreciated that the neutron amplifier of the invention operating as a sub-critical or convergent chain reactor may be operated without significant external neutron source with a time constant characteristic of the delayed neutron emitting fission products. Quantitatively a stage N may be selected for a source of delayed neutron emitters at the highest neutron flux level consistent with homogeneous reactor operation subject to the known limitations of (a) temperature, (b) precipitation of the fuel in the form of a peroxide, (c) radiation induced corrosion and (d) radiation induced dissociation of water. Xenon and other gaseous fission products may be purged by dissociation products from the solution. For example, assuming a transit time of 20 seconds from stage $n(4)$ to the third previous stage $n-3(1)$, the delayed neutron source would have 0.1% the neutron output of the material in stage $n(4)$. Further assuming that there is a gain of 10 per stage this would be the only source required to maintain the system in a subcritical stage of stability and the source 16 may thereby be removed as an excitation.

It is to be appreciated that this principle of feedback of delayed neutron emitting fission product precursors may be applied to solid rather than liquid fissionable fuels. In such a form the mechanical structure would be embodied as a conveyor of solid materials, such as a belt, a disc or wheel containing the fuel, from succeeding to preceding stages in a manner similar in principle to that described in FIG. 5.

It is to be appreciated that inherent to the feeding back of delayed neutron emitters, there is provided a distributed neutron source with respect to a particular stage. In other words, considering a substantially point source such as 16, the exciting neutrons diverge towards the fuel region 14 at a rate less distributed than if source 16 were a plurality of sources disposed along the aluminum wall 21. A plurality of sources 16 may thus be simulated by arranging the delayed neutron emitter feedback path along the interstage boundaries, or, indeed as discussed with reference to FIG. 5, within the fuel region itself.

Additional flexibility of the neutron amplifier of the invention is to be appreciated by the consideration of the effects of the temperature coefficient of the reproduction factor $K_{eff}$ on the neutron amplification characteristic.

The temperature change influence on the factor $K_{eff}$ in a stage of the amplifier is represented in the following expression:

$$K_{eff} = K_o + C(t-to) \qquad (6)$$

where $K_o = K_{eff}$ at a reference temperature to e.g. ambient; C is the temperature coefficient of reactivity (alternatively, the temperature coefficient of the reproduction factor); and $t$ is the operating temperature.

Substituting Equation 6 into Equation 2 results in $$M = \frac{1}{1-(K_o+C(t-to))} \qquad (7)$$

Expression 6 shows the effect of temperature upon the output of an amplifier stage. If C, the temperature coefficient of the reproduction factor, has a negative value, then it will serve to make $K_{eff}$ less than $K_o$ with increased temperature. This will make the increment from the critical condition greater, reduce the denominator in the Expression 7 and reduce the gain per stage. On the other hand, if the coefficient of reactivity C has a positive value, then the $K_{eff}$ will increase with temperature and will eventually approach unity. Under this condition, the denominator of the expression will approach zero and the gain will become large. The condition of critically can easily be exceeded so that the sub-critical system becomes a critical or supercritical reactor in which there is no relationship between the source intensity and the output.

If the amplifier is operating near a unity reproduction factor and with appreciable power output the neutron amplification response curve will show a non-linear characteristic and saturation will occur, provided the system has a negative temperature coefficient. As the power output is increased by changing the intensity of the neutron source 16 or by modifying the feedback control described in relation to FIG. 2, the temperature of the system will increase and the reproduction factor ($K_{eff}$) will decrease. The amplification factor will then be reduced and the output will tend to saturate.

The reverse phenomenon is theoretically possible but would be dangerous to apply. The reverse situation is a system having a positive temperature coefficient in which the rise in temperature will produce an increase in the reproduction factor $K_{eff}$, and accordingly an increased amplification factor. The output would therefore have a nearly exponential form for linearly increasing input. Such a system might become autocatalytic (self-acceleration by catalyst principle) and would undoubtedly be very difficult to control.

It is to be further appreciated that the control and variation of the gain per stage can also be achieved by the insertion of control rods in various portions of each stage, which would effectively change the efficiency factor $\alpha$ per stage. Negative control is effected by the introduction of neutron absorbers or poison rods which may be inserted either in the moderator region 13 or in the fuel region 14. Since thermal neutron absorbers are the most practical to handle, the best position for the rods would correspond to the place of highest thermal neutron density. Such a region is within the moderator regions 13, 13', etc.

Positive control in the form of additional fuel inserted as rods can also be used to change the efficiency factor $\alpha$ and consequently the gain (G). These fuel rods would accordingly be appropriately added to the fuel region 14. Of course, the use of positive control rods must be carefully limited to avoid the possibility of a divergent reaction.

The most important functional aspect of each of the amplifier stages of the invention is the determination empirically of the effective multiplication factor $K_{eff}$. Useful effective gain factors (G) per stage will range from 2 to 20. A factor $K_{eff}$ much above 0.99 must be examined and evaluated as used in the amplifier of the invention since only a small perturbation can convert the amplifier into a divergent chain reaction ($K_{eff} > 1$). If the $K_{eff}$ is kept well below unity, for example, 0.97 or lower, then, if the system is properly designed, there is no likelihood of its ever going critical and it can be considered in quite a different category from the divergent chain reactor.

To this end it is necessary therefore to determine by calculation an appropriate value for the thickness of the moderator region and of the thermal neutron barrier region as a first approximation. An experimental structure for determining the gain for a single amplifier stage as a function of fuel loading, eventually finding the critical loading and for determining the detailed flux distribution within the structure is diagrammatically shown in FIG. 3. The structure proposed is a plurality of concentric spherical shells (represented in the drawing as planar sections), the smallest and innermost shell 30 is made of a cadmium material (appropriately protected from corrosive action) having a radius of 1.5 cm. and a thickness of about 1 mm. Within the cadmium sphere 30 is placed a capsule 31 of radium mixed with beryllium of a measured neutron output of perhaps $10^7$ n/sec. The second innermost shell 32 consists of stainless steel which freely transmits thermal and fast neutrons and would have a radius of 26.5 cm. and a thickness of 1 to 2 mm. The third shell 33 made of cadmium having a radius of 41.5 cm. Alternatively it may be made of Boral (a suspension of boron carbide in ductible aluminum) or of boron containing steel. The fourth shell 34 is the outermost shield for the reactor and would preferably be made of stainless steel covered with concrete, and would have a radius of 65 cm. The regions between the several shell surfaces 35, 36 and 37 are, during operation, filled with heavy water. However it is preferable to use light water in region 36. In the outer region 37 is disposed a neutron detector such as a boron trifluoride ($BF_3$) counter, the sensitive portion 38 being connected to a suitably calibrated indicator of neutron flux such as a galvanometer 39 by means of appropriate circuit connections 40. It is to be noted that calibration of the neutron indicator means will only be established in the course of the test. A properly calibrated indicator will represent the neutron output from the amplifier stage divided by the source intensity, i.e. the gain (G). An absolute calibration is required to render instrument readings useful in more than a relative sense. Since the Ra-Be source has a different neutron spectrum from fission, care must be taken to avoid spectral perturbations. The initial calibration would be made with Ra-Be source in position but only the outer region 37 filled with $D_2O$. A plurality of control rods are provided with means for insertion and removal in the fuel region 36. Only one of these mechanisms is shown in FIG. 3 and consists of a safety control rod 41 movably inserted in a thimble or tube 44 extending through the outer surface of shell 34 through the shell member 33 opening into the fuel region 36. The control rod 41 is provided with a flat gear 42 engageable with a wheel gear 43 which, upon rotation, by means not shown, effects the movement of the rod 41 with respect to the region 36. Control rods may be placed also in moderator region 35 in a similar manner. These control rods may be gravity operated by remote control and might be electrically interlocked with a "safety" or "scram" circuit actuated by an ionization chamber or neutron detector.

The various apparatus required for adding or removing the components of the several regions are not shown but are understood to be included in the structure shown.

The suggested test is outlined in the several steps that follow:

(1) A determination of the number of neutrons emitted from the source 31 is made by measuring the slowing down distribution. This can be obtained by irradiating indium foils completely covered with cadmium. Since cadmium has a neutron resonance at 0.17 e.v., the cadmium will serve to filter out thermal neutrons and epithermal neutrons up to a few tenths of a volt. Indium has a strong resonance at 1.45 e.v. which will be unaffected by the presence of cadmium. A radial distribution would be measured and plotted $Ar^2$ vs. $r$ where A is the counting rate and $r$ is the radius in arbitrary units. (This measurement is similar to that described in U.S. Patent 2,708,656, column 19, lines 19–68.) The integral under this curve will be proportional to the number of source neutrons and will be independent of spectrum. The response of the neutron detector 39 will also be observed.

(2) Heavy water ($D_2O$) moderator will then be introduced into region 35 and light water ($H_2O$) into fuel region 36. Control rod 41 will be fully inserted.

(3) A small fraction, e.g., 10% of the $U^{235}$ estimated for criticality in the form of uranyl sulfate ($UO_2SO_4$) is then added to the water in region 36 and thoroughly mixed. The control rod 41 is then slowly and carefully removed at a rate not greater than 0.01% in $K_{eff}$ per second. The neutron detector 39 will be observed during the removal of the rod to be sure criticality is not exceeded. The reading of the detector 39 when the rod 41 is completely removed is the first measurement.

Figure 4:
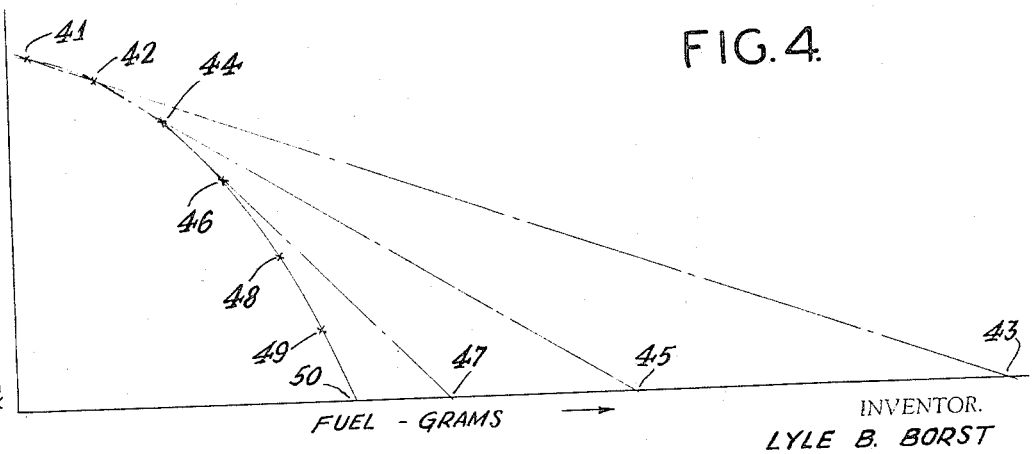
FIG. 4 is a graph representing the relationship of the reciprocal of neutron flux as a function of the fuel quantity required.

(4) A second similar portion of uranyl sulfate is then added and the procedure of step 3 is repeated. A plot is made of the reciprocal of the neutron detector reading (1/A) as a function of the total fuel as shown in FIG. 4.

(5) Plotted points 41 and 42 may be taken to represent the readings of steps 3 and 4 respectively. After each reading the last two points will be connected by a straight line extended to intersect the horizontal axis. This intersection point will be the extrapolated critical condition of fuel. Thus points 41 and 42 extrapolated intersect the axis at the critical fuel at 43.

(6) Additional portions of fuel will be added and the procedure repeated. After each of several additions the extrapolations will indicate more and more nearly the same extrapolated critical loading which may be used as a guide for choosing the fuel addition portions required. Such steps are apparent from FIG. 4 wherein the third reading 44 extrapolated from second reading 42 intersects the axis at 45, and the fourth reading 46 extrapolated from third reading 44 intersects the axis at 47. Extrapolations of fifth and sixth readings 48 and 49, respectively, intersect the axis at the common point 50 showing that the straight line prediction is substantially coincident with the actual characteristic of the reactor.

(7) When one of the readings taken above approaches the neutron emission of the neutron source 31 observed in step 1, the gain of the amplifier will be approximately unity. At this condition the fuel loading procedure, outlined in steps 2 to 6, will be interrupted and a second indium resonance flux integral is obtained. The proportionality factor relating to the neutron detector reading and fast neutron leakage for both cases can thus be determined. Thereafter the neutron detector reading, suitably corrected with the proportionality factor, may be used to relate the output of the amplifier to the input (Ra=Be source intensity). A curve (not shown) of the reciprocal of the gain (proportional to the ordinate of FIG. 4) against the fuel loading should be nearly linear and extrapolate to the same critical loading described in step 6. The gain (G) is determined by the ratio of the detector reading to the neutron source intensity.

Additional experiments may be made to determine the effects of feedback, temperature and possible geometric perturbation of the system by the steps outlined above.

(8) Small additions of fuel will be followed by careful rod removal. The fuel additions will be located along the line connecting point 49 and extrapolated critical point 50 but not at criticality. Fuel additions are made until a desired gain is established, e.g., 10. Flux distributions for thermal neutrons, epithermal (e.g. indium resonance) neutrons and fast neutrons will then be obtained. With these data the intrinsic amplification (M) of a stage and the stage efficiency ($\alpha$) can be established.

(9) Additional experiments may be made to determine optimum values of the dimensions of the various regions and to determine the effects of feedback, temperature and possible geometric perturbations of the system.

While the invention has been described in terms of neutron generation, it will be appreciated that the neutrons produced in each fuel region are a by-product of the fission reaction therein. The heat of the fission reaction may be used directly as a source of power by means of any known heat transfer means such as described in Fermi patent, 2,708,656. Accordingly, the invention is a power generator, intrinsically stable, under the control of a relatively very small power (neutron) source. Further, depending on the character of the source, i.e. whether or not the source is modulated as a function of time, the generated power may vary accordingly or, indeed, may be a saturated (constant) output with a varying input.

While the theory of the convergent nuclear chain fission reaction in uranium set forth herein is based on the best presently known experimental evidence I do not wish to be bound thereby as additional experimental data later discovered may modify the theory discussed.

I claim:

1. A regenerative subcritical neutron amplifier comprising a plurality of directionally polarized convergent neutron generator stages in cascade, each stage comprising a region of neutron moderator material, a region of thermal neutron fissionable isotope material having the characteristic of emitting a small percentage of delayed neutrons, and a region of thermal neutron barrier material, the neutron moderator region being the input of each stage, and the thermal barrier region being the output of each stage, an extinguishable epithermal neutron source, means for projecting neutrons from the source into the input region of the first stage, means for projecting neutrons of each output region into the input region of each succeeding stage, means for transferring a portion of the fissionable isotope material from a stage to a selected preceding stage, and means for extinguishing the neutron source when the amplifier has reached a predetermined steady-state production of neutrons.

2. A subcritical regenerative neutron amplifier comprising a plurality of directionally polarized convergent neutron generator stages, each stage comprising a zone of neutron moderator material, a zone of thermal neutron fissionable isotope material having the characteristic of emitting a small percentage of delayed neutrons, and a zone of thermal neutron barrier material, the neutron moderator zone being the input of each stage, and the thermal barrier zone being the output of each stage, an extinguishable epithermal neutron source, means for projecting neutrons from the source into the input zone of the first stage, means for projecting neutrons of each output zone into the input zone of each succeeding stage, and means for transferring a portion of the fissionable isotope material from a stage to a selected preceding stage.

3. A subcritical neutron amplifier having a controllable neutron source and, associated with said source in cascade, and input region of neutron moderator material in which neutrons of epithermal energy from the source are moderated to thermal energy levels, a sequent fuel region containing neutron fissionable material in mass concentration and geometric configuration adapted to augment the neutron flow by a subcritical reaction, and an output region comprising a thermal neutron barrier, provided with means to vary the transparency thereof and being substantially opaque to thermal neutrons but transmissive to epithermal neutrons whereby an amplified neutron output is subcritically produced.

4. A neutron amplifier according to claim wherein said transparency varying means has operating means responsive to a time-varying function whereby the neutron flow may be modulated as a function of time.

5. A neutron amplifier according to claim 3, wherein the neutron fissonable material is in an hydrogenous environment.

6. A subcritical polarized neutron amplifier which comprises a neutron generator stage having three zones arranged in cascade in which the intermediate zone includes thermal neutron fissionable isotope material in an hydrogenous environment, one of the outer zones includes thermal neutron absorber material and the other of the outer zones includes neutron moderator material and a neutron exciter adjacent the neutron moderator zone for projecting epithermal neutrons thereto, the mass concentration and geometric configuration of the materials of said three zones being adapted to augment the neutron flow by a self-sustaining convergent chain reaction, whereby an amplified flow of epithermal neutrons from said thermal absorber zone is produced.

7. A neutron amplifier according to claim 6 wherein means are provided to vary the transparency of the thermal neutron absorber material.

References Cited by the Examiner

UNITED STATES PATENTS 2,780,595  2/1957  Fermi _____ 176—19

OTHER REFERENCES

Glasstone, Principles of Nuclear Reactor Engineering, page 827, D. Van Nostrand Co., Inc., Princeton, N.J., 1955.

KAPL–M–RWS–1, A Stable Fission Pile With High Speed Control, Samsel, Feb. 14, 1947, declassified March 9, 1957, 7 pages.

REUBEN EPSTEIN, *Primary Examiner.*

LEON D. ROSDOL, ROBERT L. CAMPBELL,
*Examiners.*

S. F. STONE, W. T. HOUGH, *Assistant Examiners.*